United States Patent [19]
Ishida et al.

[11] Patent Number: 6,041,032
[45] Date of Patent: Mar. 21, 2000

[54] DISK CHANGER WITH TRAYS MOVABLE BETWEEN RETAINING AND DRAWN-OUT POSITIONS

[75] Inventors: Nobuo Ishida; Jun Togashi; Tomomichi Kimura; Kiyoshi Morikawa; Yoshihumi Nakayama; Hiroshi Akiyama; Tatsuya Yanagisawa; Takashi Ota, all of Kawagoe, Japan

[73] Assignee: Pioneer Electronic Corp., Japan

[21] Appl. No.: 08/877,805

[22] Filed: Jun. 18, 1997

[30] Foreign Application Priority Data

Jun. 19, 1996 [JP] Japan .................................. 8-178549

[51] Int. Cl.[7] .................................................. G11B 17/26
[52] U.S. Cl. .............................................. 369/191; 369/36
[58] Field of Search .................................. 369/33, 34, 36, 369/38, 178, 179, 191, 192, 193, 201, 202; 360/98.04, 98.06, 99.02, 99.06

[56] References Cited

U.S. PATENT DOCUMENTS

| | | | |
|---|---|---|---|
| 4,688,124 | 8/1987 | Scribner et al. | 369/191 |
| 4,800,551 | 1/1989 | Norris | 369/191 |
| 5,524,003 | 6/1996 | Tsuchiya | 369/191 |

FOREIGN PATENT DOCUMENTS

| | | | |
|---|---|---|---|
| 63-204548 | 8/1988 | Japan | 369/191 |
| 63-292452 | 11/1988 | Japan | 369/191 |
| 1-211364 | 8/1989 | Japan | 369/36 |
| 6-60522 | 3/1994 | Japan | 369/178 |
| 6-131789 | 5/1994 | Japan | 369/178 |
| 7-37315 | 2/1995 | Japan . | |

*Primary Examiner*—David L. Ometz
*Attorney, Agent, or Firm*—Evenson, McKeown, Edwards & Lenahan, P.L.L.C.

[57] ABSTRACT

A disk changer stably maintains a tray with a selected disk loaded thereon even if a physical impact or vibration is loaded from outside therein while the tray is being drawn out, the disk is being reproduced, or the tray is being retained. The disk changer has a retaining device which retains therein a plurality of trays each for loading a disk thereon at corresponding retaining positions parallel to each other in a horizontal state and also draws each tray out from the retaining position in the substantially horizontal direction, a guide member provided at a position corresponding to the retaining position, a tray moving mechanism engaging with a tray selected from the plurality of trays, causing the selected tray to engage with the guide member, and drawing out the selected tray partially or entirely from the retaining device in the substantially horizontal direction to move the tray to a position corresponding to the selected tray, a driving device which drives a disk on the selected tray drawn out to the drawing-out position, having a tray loading section for loading thereon the selected tray, and the guide member engages with the selected tray when the selected tray is drawn out by the tray moving mechanism, and elastically maintains the selected tray on a plane substantially identical to that of the corresponding retaining position collaborating with the retaining device and/or the tray loading section.

22 Claims, 11 Drawing Sheets

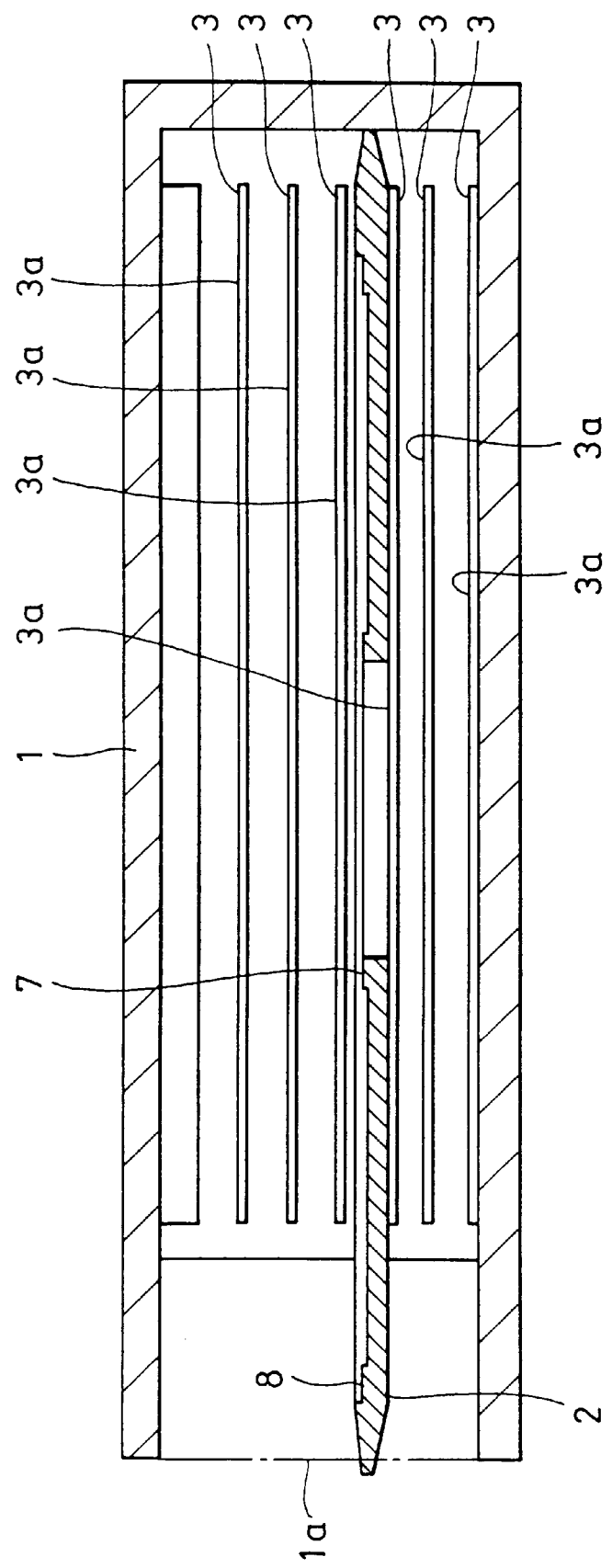

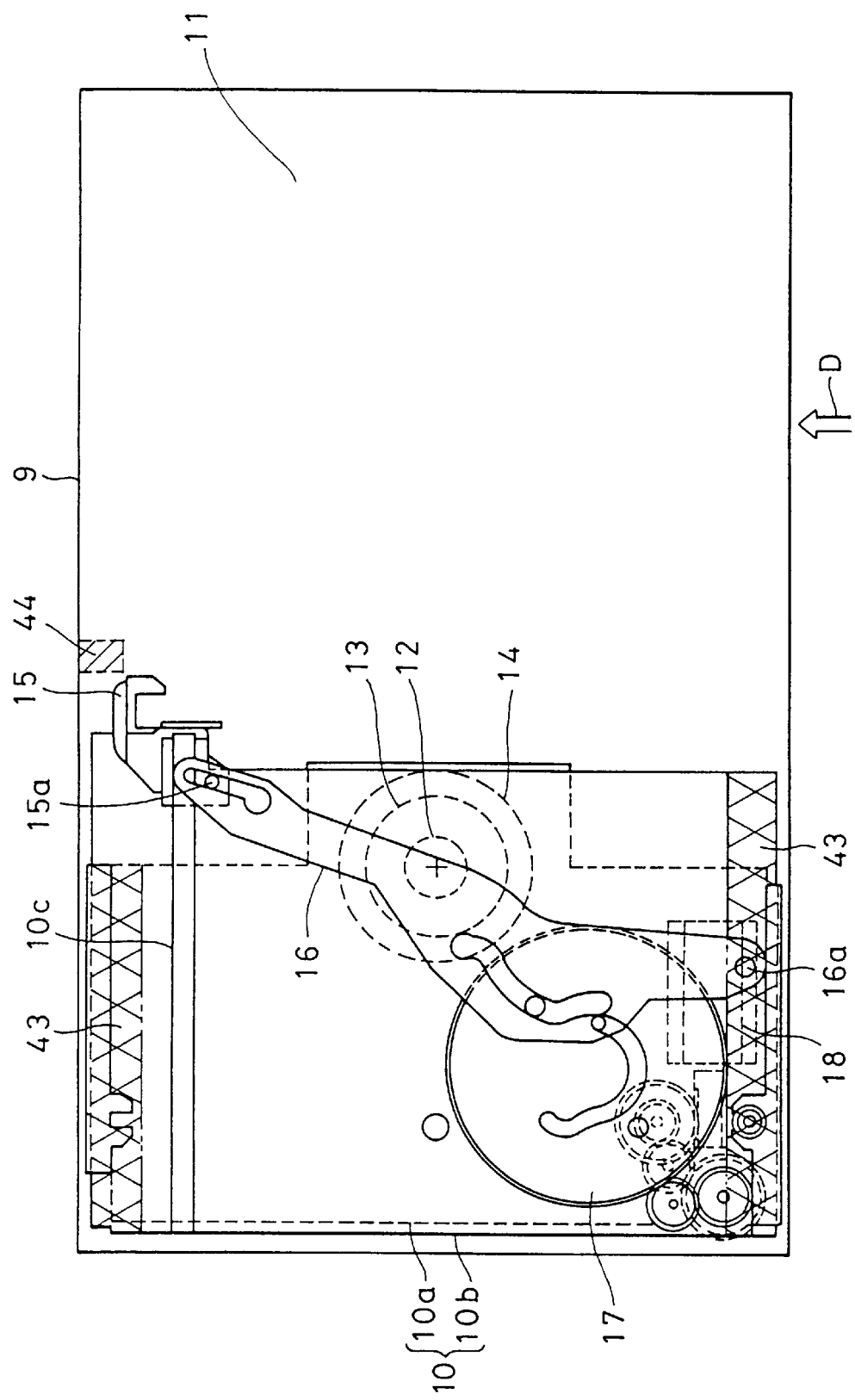

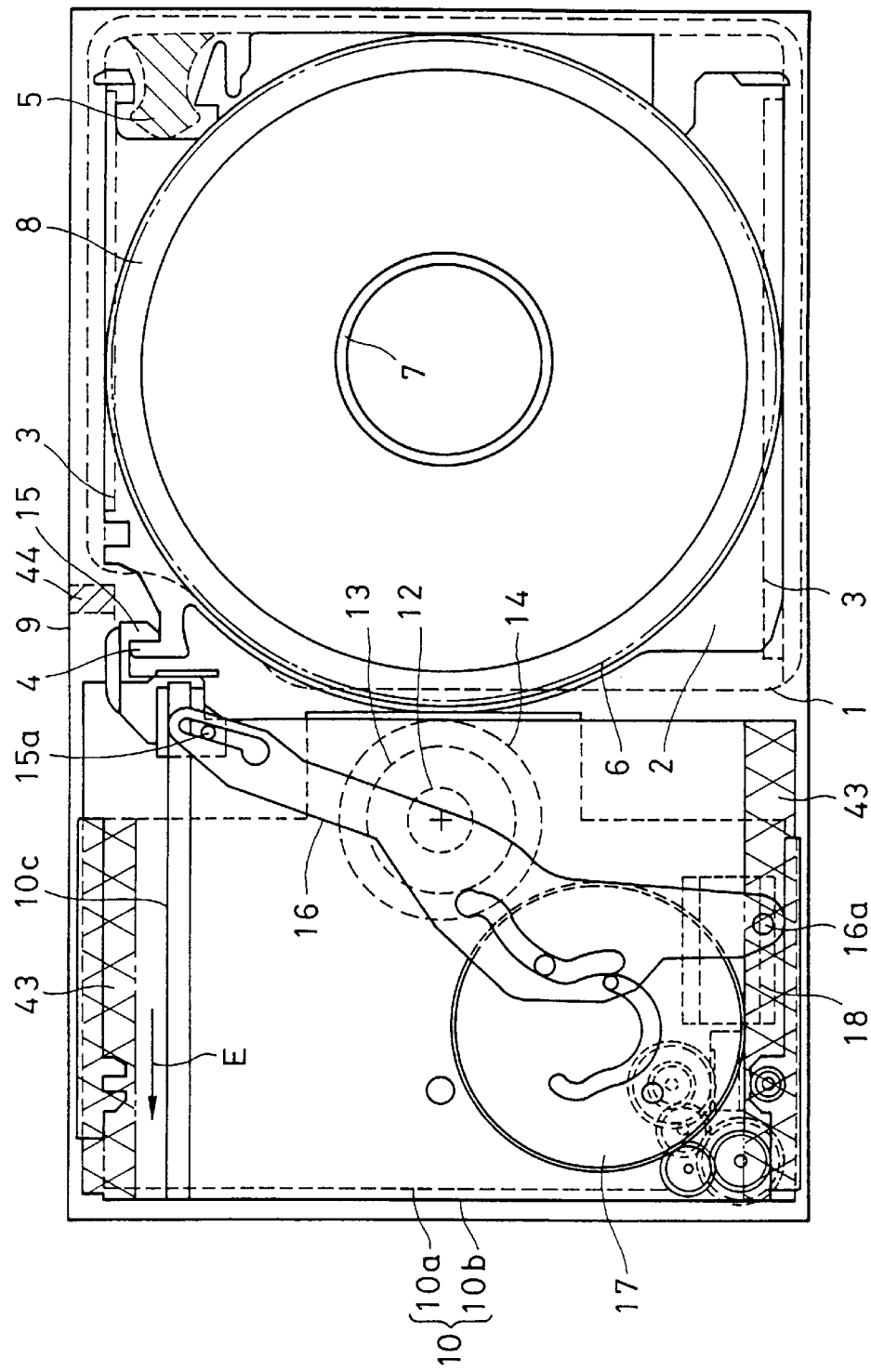

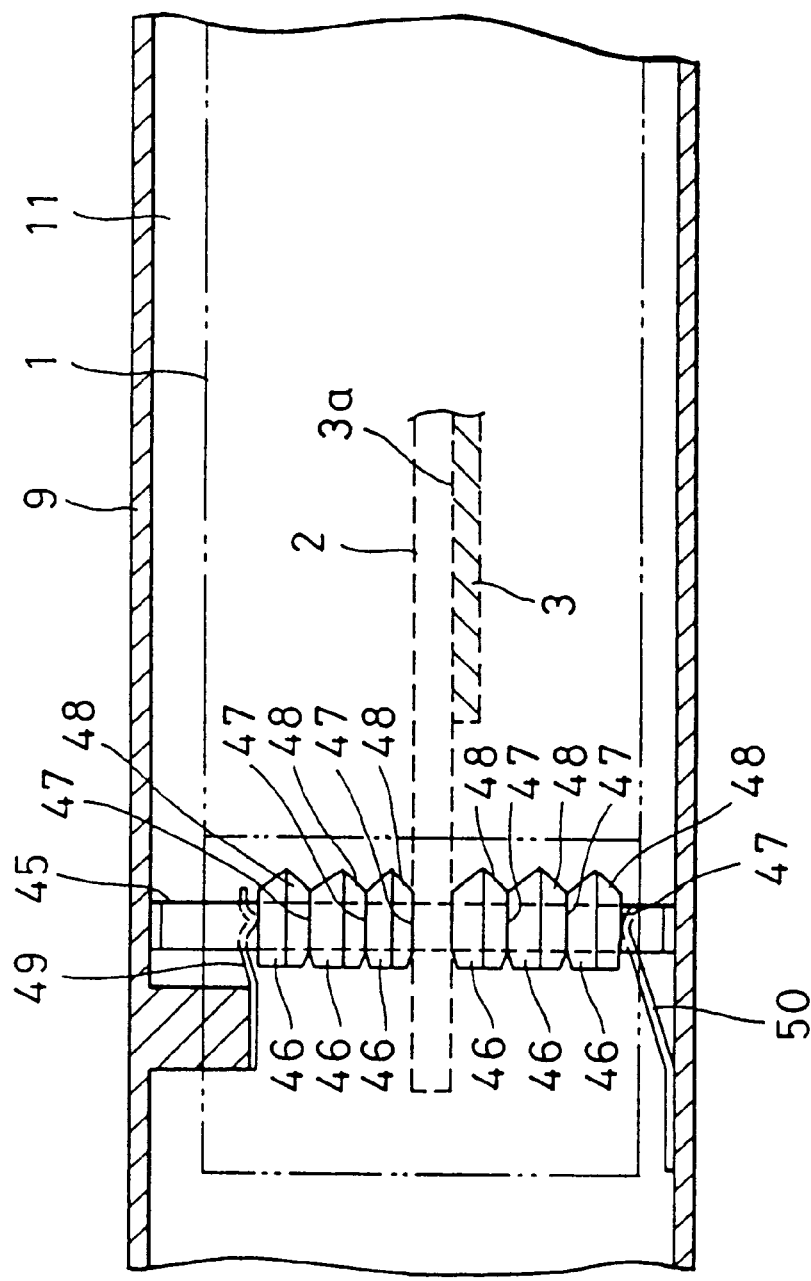

DISK CHANGER WITH TRAYS MOVABLE BETWEEN RETAINING AND DRAWN-OUT POSITIONS

BACKGROUND OF THE INVENTION

1. Field of the Invention

The present invention relates to a disk changer for selecting a desired disk from a plurality of information recording disks (referred to simply as "disks" hereinafter), such as optical disks, loaded on a plurality of trays respectively, of the type that draws out a desired disk together with the tray, and drives the disk with a driving device.

2. Description of Related Art

There is a known disk changer which houses a magazine loading therein a plurality of disks such as compact disks, selects a desired disk from disks in the magazine, draws out the desired disk, and reproduces the desired disk with a driving device.

With a disk changer of the prior art, when a disk loaded in a magazine is driven for reproduction, a selected tray with a disk is drawn out from a housing section. The tray is placed on a guide member, then a turntable moves the disk away from the tray in the vertical direction and, thereafter clamps the disk with the cooperation of a clamper, to reproduce the disk.

However, during the section and drawing out of a tray with a disk loaded thereon from such a magazine, and subsequent separation of the disk from the tray to reproduce the disk, the tray in the process of drawing out may be displaced in the vertical direction if an impact or vibration or the like is applied to the disk changer from outside. Since the disk changer has a structure that the tray slides on a corresponding slide guide in the magazine, and only a small space is provided between the sliding tray and a slide guide right above it, the tray will collide with the slide guide right above it when the tray is displaced in the vertical direction. This will cause irregular sounds at collision, thus operating quality of the disk changer being greatly deteriorated.

Similarly, during the reproduction of the disk, since the selected tray is placed on a guide member provided in the housing in which the driving part 104*a* is placed, and there only is a small space between the tray and the guide member right above the tray, the tray will collide with the guide member right above it as the tray moves in the vertical direction when a vibration is applied, and irregular sounds are generated at collision, whereby operating quality of the disk changer is greatly degraded.

OBJECTS AND SUMMARY OF THE INVENTION

The present invention was made to solve problems described above, and it is an object to provide a disk changer which holds horizontally a selected tray on which a selected disk is loaded in a stable manner even if an impact or vibration or the like is given to the tray from outside while the tray is drawn out or the disk is reproduced or the tray is retained, and so on, so that the tray is allowed to operate optimally.

According to a first aspect of the invention, a disk changer comprises a disk retaining device for retaining a plurality of trays, on each of which a disk can be loaded, in a manner that said trays can be drawn out from their retaining positions respectively, a guiding device which is disposed to correspond to said retaining positions, for guiding said tray in a process of drawing out said tray or a process of putting back said tray, a tray moving device for drawing out a tray selected from the plurality of trays retained in the retaining device and for putting back the tray to said retaining position, a driving device for driving a disk moved by the tray drawn out by the tray moving device, wherein the guiding device elastically holds the selected tray when the selected tray is being drawn out by the tray moving device or after the selected tray bas been drawn out.

According to a second aspect of the invention, in a disk changer as described above, the guiding device comprises a plurality of guide parts respectively corresponding to the trays being retained.

According to a third aspect of the invention, in a disk changer as described above, the guide parts are movable to predetermined positions correspondingly to the position of each tray.

According to a fourth aspect of the invention, in a disk changer as described above, the guide parts are made of a plurality of movable pieces arranged correspondingly to a direction of the trays being retained.

According to a fifth aspect of the invention, in a disk changer according to the fourth aspect of the invention, the selected one of trays is supported by a pair of pieces selected from the plurality of pieces.

According to a sixth aspect of the invention, in a disk changer as described above, the plurality of pieces are slidably fitted on a shaft arranged in a substantially same direction as a direction of arrangement of the trays being retained.

According to a seventh aspect of the invention, in a disk changer according as described above, the plurality of pieces are pushed by a resilient force in a direction in which the plurality of pieces are arranged.

According to an eighth aspect of the invention, in a disk changer as described above, the plurality of pieces are pushed by resilient forces at both ends thereof in the direction of arrangement.

According to a ninth aspect of the invention, in a disk changer described above, the resilient forces, which are applied to both ends of the plurality of pieces in the direction of arrangement, are different from each other.

According to a tenth aspect of the invention, in a disk changer according to a sixth aspect of the invention, each of the plurality of pieces has a slant portion which moves the piece in the direction of arrangement as being pressed by an end of the tray.

According to an eleventh aspect of the invention, a disk changer comprises a disk retaining device for retaining a plurality of trays, on each of which a disk can be loaded, in a manner that the trays can be drawn out from their retaining positions respectively, guiding device, which is disposed to correspond to the retaining positions, for guiding said tray in a process of drawing out said tray or a process of putting back said tray, a tray moving device for drawing out a tray selected from said plurality of trays retained in said retaining device and for putting back said tray to the retaining position, and a driving device for driving a disk moved by said tray drawn out by said tray moving device, wherein the disk retaining device has a supporting part which supports the trays at predetermined positions in the direction of arrangement of the disks, and wherein the guiding device elastically support the selected tray in a manner as to push the selected tray against the supporting part while the selected tray is being drawn out by said tray moving device or after the selected tray has been drawn out.

According to a twelfth aspect of the invention, a disk changer comprises a disk retaining device for retaining a plurality of trays, on each of which a disk can be loaded, in a manner that the trays can be drawn out from their retaining positions respectively, a guiding device which is disposed to correspond to the retaining positions, for guiding the tray in a process of drawing out the tray or a process of putting back the tray, a tray moving device for drawing out a tray selected from the plurality of trays retained in the retaining device and for putting back the tray to the retaining position, and a driving device for driving a disk moved by the tray drawn out by the tray moving device, wherein the driving device has a positioning part which supports the tray drawn out, and wherein the guiding device elastically support the selected tray in a manner as to push the selected tray against the positioning part while the selected tray is being drawn out by the tray moving device or after the selected tray has been drawn out.

As the present invention has the configuration as described above, when a selected tray is drawn out from a retaining position, the selected tray is engaged with guide members to be held therebetween, and is pressed by a retaining device and/or a tray loading section, whereby the selected tray is elastically maintained on the substantially same horizontal plane as that of the corresponding retaining position. As a result, when a tray is drawn out or a disk is played back or the tray is retained, a disk changer can maintain a selected tray stably and horizontally to operate it.

BRIEF EXPLANATION OF THE DRAWINGS

FIG. 6 is a view showing the state of storing a tray in a frame of a magazine of a second embodiment of the disk changer according to the present invention:

FIG. 7 is a top view of a main unit showing an example of main internal configuration of the main unit of a disk changer according to one embodiment of the present invention;

FIG. 8 is a view showing a state where a magazine is retained in a main unit of a disk changer according to one of embodiments of the present invention;

FIG. 10 is a sectional view showing configuration in a state where a selected tray is drawn out and engaged with a guide member by one embodiment of the disk changer according to the present invention.

DETAILED DESCRIPTION OF THE PREFERRED EMBODIMENTS

Before describing in detail the preferred embodiments of the present invention, description is made for an example of a disk changer in the prior art with reference to the corresponding drawings.

Figure 1:
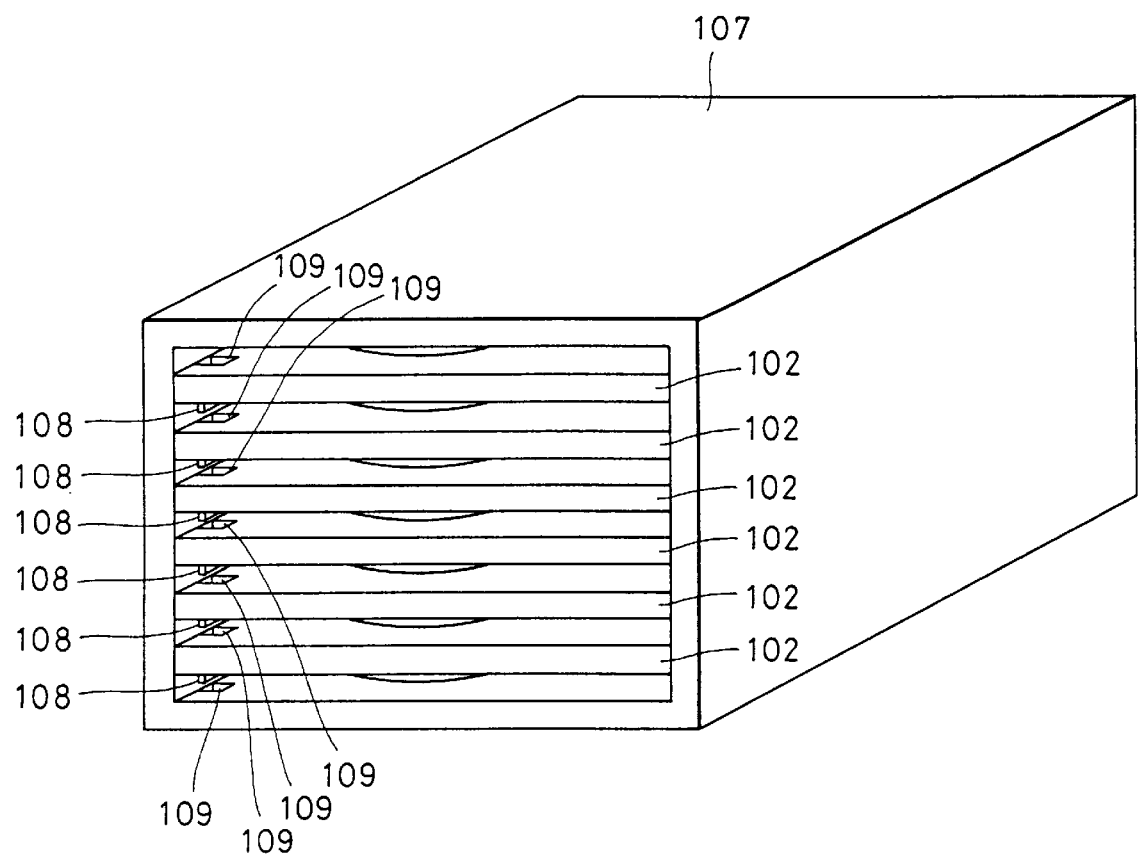
FIG. 1 is a view showing external appearance and configuration of an example of magazine used in a disk changer in the prior art.

FIG. 1 is a view showing external configuration of an example of magazine used in a dick changer in the prior art, and as shown in this figure, in a casing 107 of the magazine, a plurality of trays 102 each having an identical flat shape are maintained horizontally by respective slide guides 108 which are formed to protrude on both inner sides of the casing 107 in a rib-like shape, and arranged in parallel to each other at specified intervals. The casing 107 has an aperture section at a front side, and each of the trays is formed so that each tray can be drawn out through the aperture section or retained along the corresponding slide guides 108.

Figure 2:
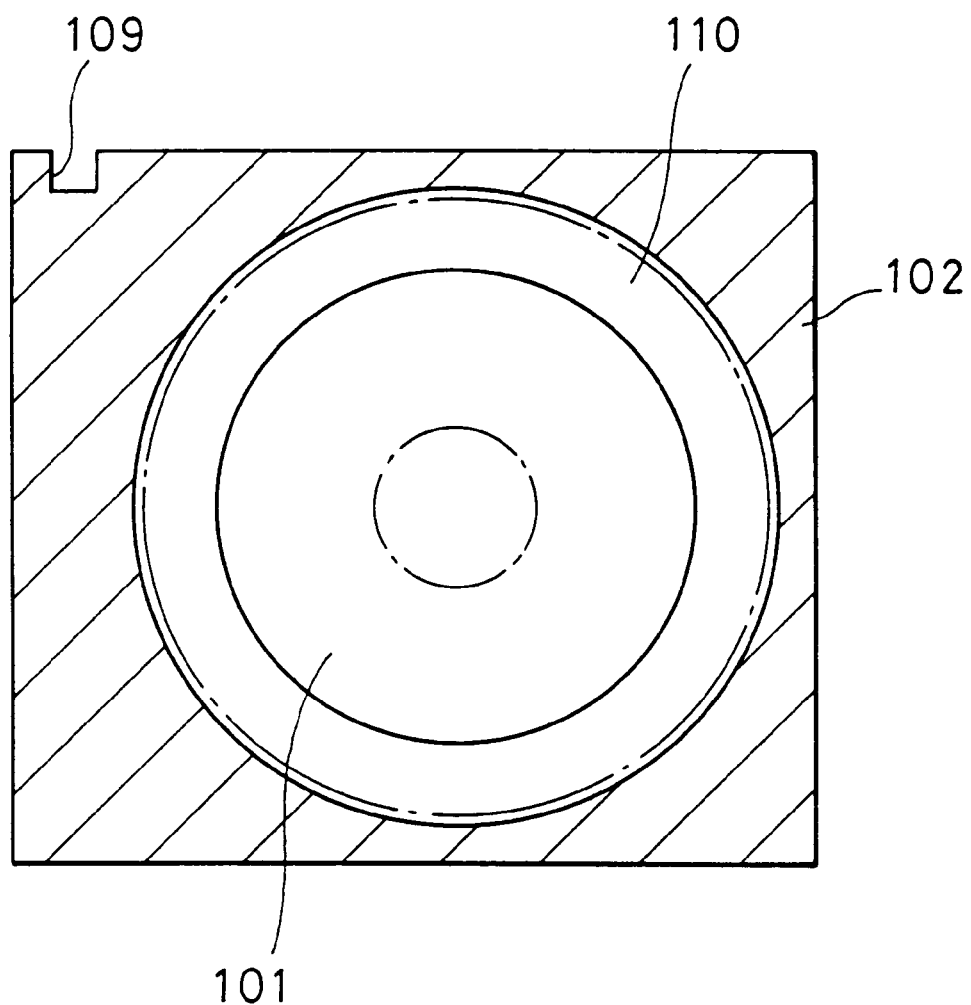
FIG. 2 is a top view showing a tray of a magazine used in a disk changer in the prior art.

FIG. 2 is a top view of a tray 102. In the tray 102, a loading section 110 is formed which has a size Corresponding to an outside diameter of a disk 101 which is loaded on the tray and has a ring-shaped recessed area provided with an opening of a specified size at a center thereof. The tray 102 is configured to support the disk 101 with the circumference area (shown with dotted chain line in the figure) put on the loading section 110.

Figure 3:
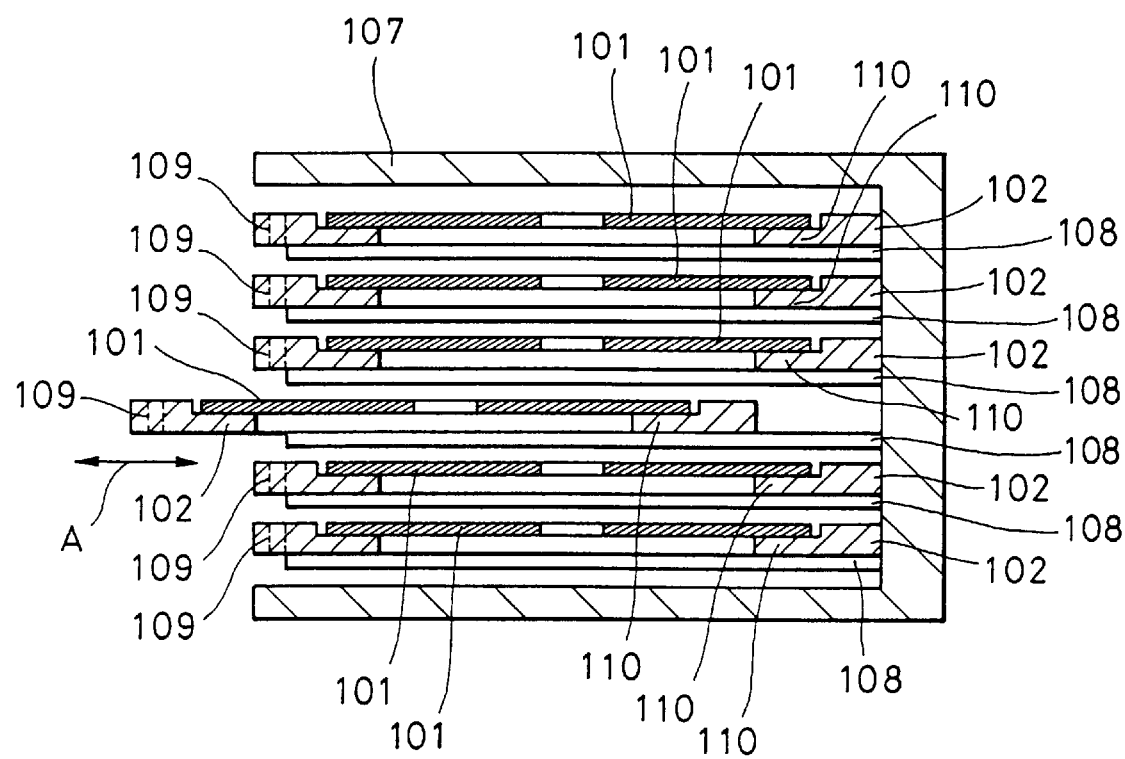
FIG. 3 is a cross-sectional view showing internal configuration of a magazine used in a disk changer in the prior art.

FIG. 3 is a cross-sectional view showing internal configuration of a magazine inside of which the disk 101 is retained at a respective retaining position on each tray 102. At the retaining position, each tray is horizontally maintained by a slide guide 108 formed corresponding to the tray and also maintained on each slide guide respectively by an elastic maintaining member not shown herein with the specified elastically maintaining force so that the tray 102 will not fall through the opening section. Also, a hook 109 is respectively formed on a side end part of each tray 102, and as illustrated in the figure, when the magazine is loaded in the disk changer, a tray drawing-out mechanism, that a driving device of the disk changer has, engages with the hook 109 of a selected tray 102. By the pulling or pushing motion of the mechanism with a force larger than the above-described specified elastically maintaining force of the elastic maintaining member, the tray 102 slides on the slide guide 108 along the direction shown by an arrow A in the figure. By this sliding motion, a plurality of disks can be in turn selected and reproduced, and retained in the magazine.

As described above, the slide guides 108 are positioned horizontally with a same distance therebetween so that the slide guide holds the trays 102 horizontally with a same distance between each of the tray and slides the trays 102 horizontally. The distance between the trays is set to be slightly wider than thickness of the tray so that each of the trays can be drawn out smoothly.

Figure 4A:
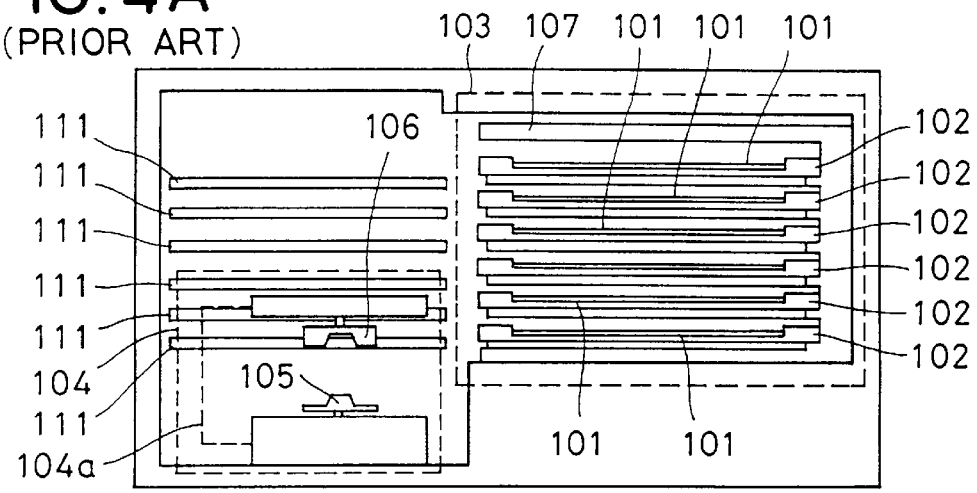
FIG. 4A is a view showing an example of operational sequence from drawing out a tray to reading a disk for a risk changer in the prior art.
Figure 4B:
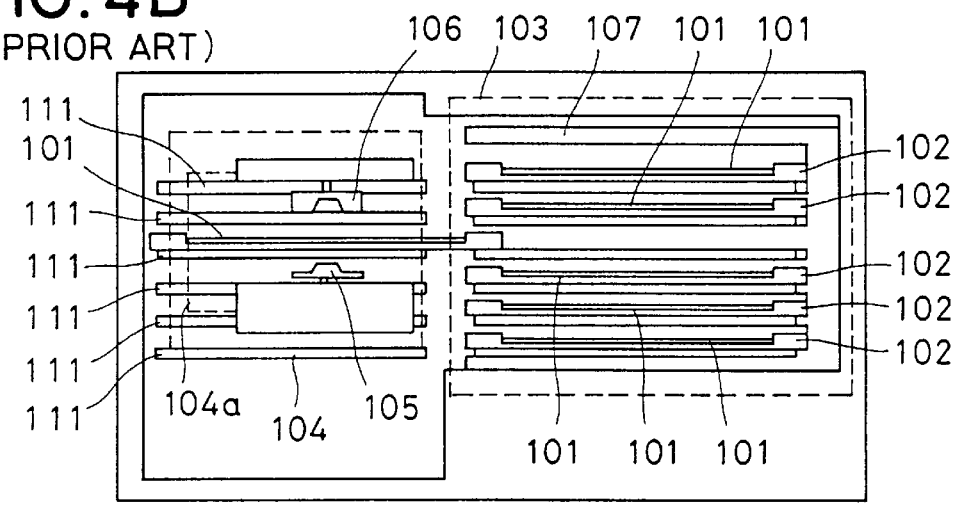
FIG. 4B is a view showing another example of operational sequence from drawing out a tray to reading a disk for a disk changer in the prior art.
Figure 4C:
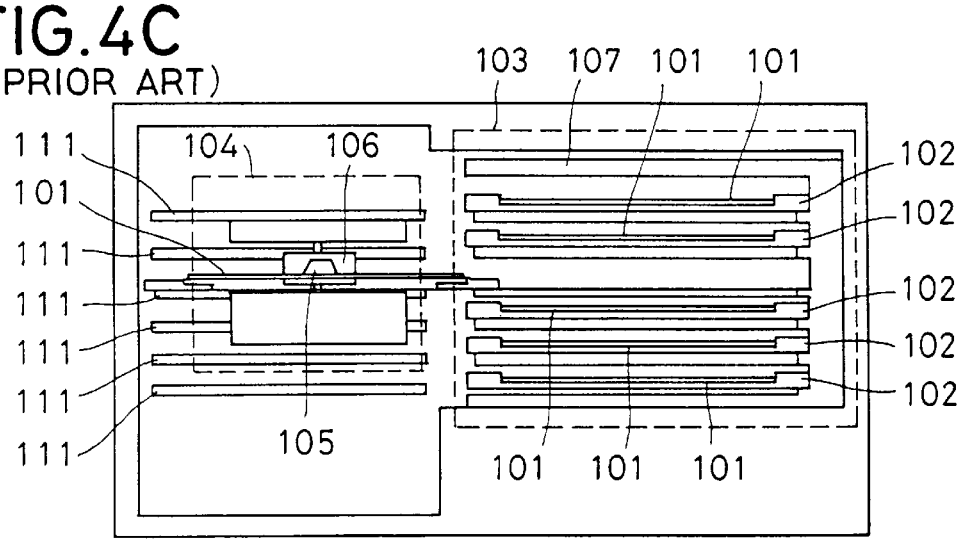
FIG. 4C is a view showing another example of operational sequence from drawing out a tray to reading a disk for a disk changer in the prior art.

FIG. 4A to FIG. 4C show an example of operational sequence operation from a step of drawing out a tray to a step of playing back a disk in the disk changer in which the magazine shown in FIG. 1 is loaded. In FIG. 4A, the disk changer comprises a retaining section 103 for retaining the magazine in its housing and a driving section 104 adjoining the retaining section 103, provided a driving device 104a for loading and reproducing a disk. The driving device 104a comprises a turntable 105 for loading thereon and rotating the disk and a clamper 106, and so on.

As shown in FIG. 4B, when one tray 102 is selected in response to a command, the driving device 104a moves in the direction of the arrangement of the disks 101 (the vertical direction in FIGS. 4A through 4C) until the driving device 104a reaches a position corresponding to the height of the selected tray. The selected tray 102 is then drawn out from the magazine to a reproduction position on the driving device 104a by a tray drawing-out mechanism not shown herein.

Further, as shown in FIG. 4C, the turntable 105 and the clamper 106 collaborate to hold the disk 101 between them in a state that the disk 101 is separated from the tray 102, and rotate the disk 101 in that state; whereby a pickup not shown herein can read information of the disk.

As shown in FIGS. 4A through 4C, on an inner sidewall of the housing of the disk changer at a position where the driving device 104 is located, a plurality of guide members 111 having a rib-like form each having a horizontal plane identical to a tray loading plane of each of the slide guides 108 are fixedly provided corresponding to the slide guides 108, and when the selected tray 102 is drawn out from the magazine, a portion of the drawn out tray 102 is loaded thereon so that the tray 102 is maintained horizontally.

Therefore, like the slide guides 108, guide members 111 are horizontally provided with a uniform distance between each other, and the distance is set to be slightly wider than thickness of the tray 102 so that each of the trays 102 can be drawn out smoothly.

In FIGS. 4A through 4C, in order to make the size as small as possible, the disk changer is configured that the disk 101 and a portion of the tray 102 are positioned in the magazine when the disk 101 is clamped at the reproduction position.

When the reproduction of the disk is finished, the turntable 105 and clamper 106 are separated from the disk 101, and the disk 101 is loaded on the tray again and put back in the magazine with the tray, by the tray drawing mechanism which is not shown in the Figure.

As described above, with the disk changer of the prior art, when driving a disk loaded in a magazine for reproduction, a selected tray with the disk is drawn out from the retaining section, the tray is loaded on the guide member, and the disk is separated from the tray in the vertical direction by the turntable. Then the disk is clamped by the turntable collaborating with the clamper, to produce the disk.

However, as mentioned above, when selecting and drawing out a tray on which a disk to be played back is loaded from such a magazine and separating the disk from the tray to play back the disk, if an impact or vibration or the like is applied to the CD changer from outside, the tray in a process of drawing out which, for example, slides on a corresponding slide guides in the magazine, moves in the vertical direction. Since there is a small space between the sliding tray and the slide guide right above it, the tray collides with the slide guide right above it, and irregular sounds are generated at collision, thus, operating quality of the disk changer will be deteriorated significantly.

As mentioned above, also in a process of reproduction of a disk, a selected tray is placed on a guide member provided in the housing in which the driving part 104a is positioned.

As there is a small space between the tray and the guide member right above the tray, the tray collides with the guide member right above it when the tray moves in the vertical direction, and irregular sounds are generated at collision, whereby operating quality of the disk changer will be deteriorated significantly.

Figure 5:
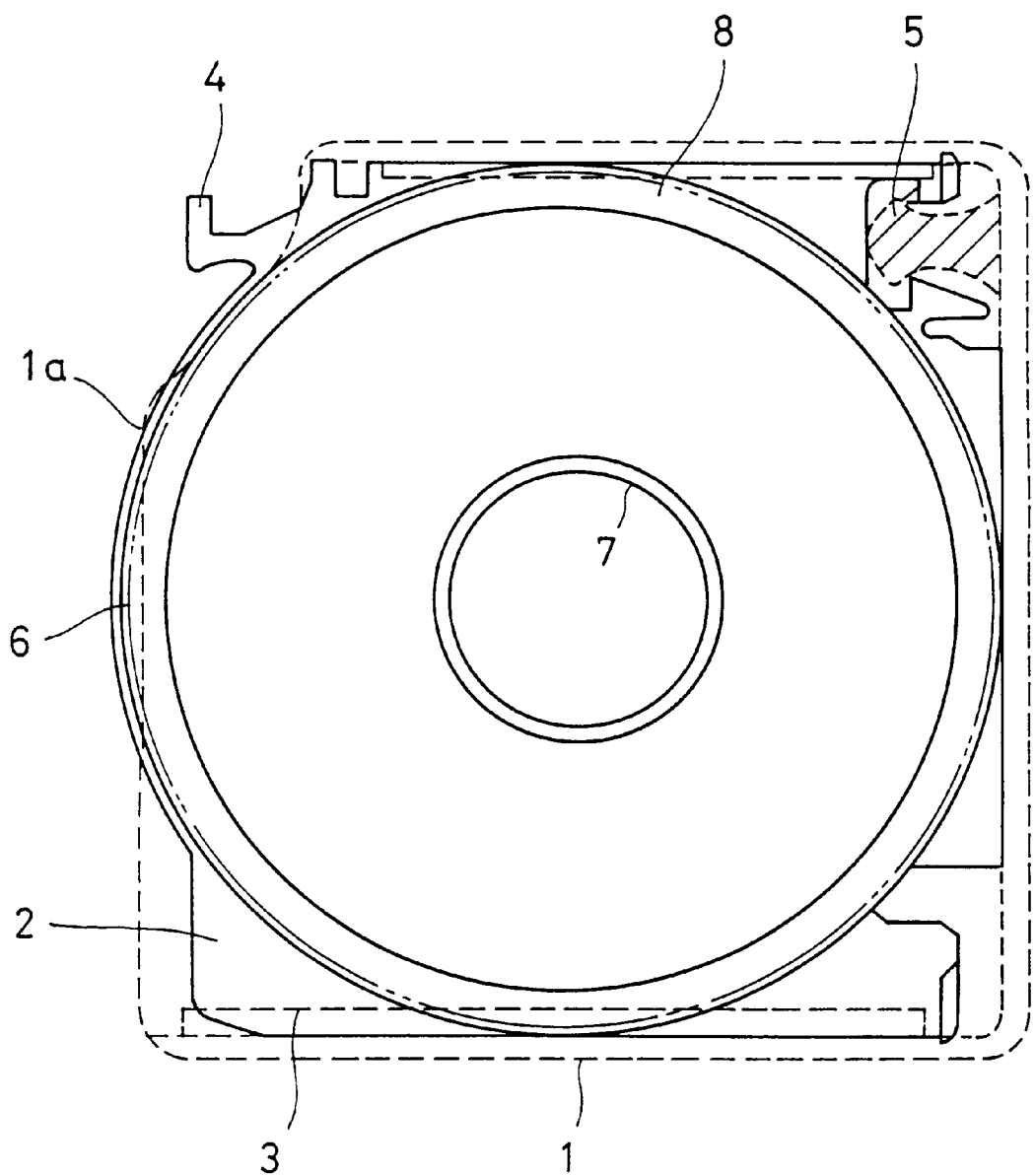
FIG. 5 is a top view showing configuration of a magazine of an embodiment of the disk changer according to the present invention.

Next, description is made for embodiments of the present invention with reference to FIG. 5 to FIG. 7.

FIG. 5 is a top view showing configuration of a magazine of one embodiment of the disk changer according to the present invention wherein a part of the magazine is removed for explanatory purposes. In the similar manner as the example of the prior art magazine explained before, the magazine has the configuration in which a plurality of trays 2 retained from an opening section 1a can be arranged in parallel to each other with an even space inside the case 1 with the opening section 1a formed on one of the front face thereof.

As shown in FIG. 5, each of the tray 2, as in the prior art, has loading sections 7 and 8 for loading thereon a disk 6, such as an optical disk, in which information has been recorded or is to be recorded; and each tray is formed into an identical flat shape by the molding of a resin or the like.

As shown in FIG. 6, at both inner side surface of the case 1 of the magazine, a plurality of supporting sections 3 of a rlb-like form are formed for supporting the plurality of trays 2 substantially parallel to each other with a specified space therebetween. Each of supporting sections 3 comprises a horizontal supporting surface 3a, which are formed along a direction of arrangement of the trays 2 with an even space. The horizontal supporting surface 3a maintains each tray 2 by placing thereon a part of the bottom face of each corresponding tray 2.

FIG. 6 is a cross-sectional view showing a state where one of the trays 2 is retained at a corresponding retaining position by a corresponding supporting surface 3a in the frame 1 of the magazine, and normally the magazine has the configuration in which other trays 2 not shown are retained by other supporting surfaces 3a in the case 1.

When the tray 2 is at a retaining position, as shown in FIG. 5, the tray engages with an elastically maintaining member 5 provided in the frame 1 so that unnecessary fall of the tray from the magazine is prevented, and the engagement of the tray is canceled if tray is drawn by a specified force.

The the magazine of one embodiment of the disk changer according to the present invention has the configuration as described above, and when the magazine is loaded in a main unit for recording information in (or playing back) a disk, a tray selected by a driving device that the main unit has is properly drawn out, and an operation of recording (or for playing back) the disk loaded on the tray is executed.

FIG. 7 is a top view showing an example of major internal parts of the main unit of one embodiment of the disk changer according to the present invention.

As shown in the figure, in the inside of a housing 9 of the main unit, a retaining section 11 is provided having a specified space for retaining a magazine, and when the magazine is inserted in the direction indicated by an arrow D from a magazine inserting opening (not shown) provided in the front side of the housing 9, the magazine can be retained in the housing. Also, a driving device 10 for driving a disk is provided in the housing 9 at a position adjacent to the retaining section 11.

The driving device 10 is movable in a direction perpendicular to plane of FIG. 7 by means of an elevation Mechanism which is not shown in the figure, and comprises a reproduction section 10a which includes a spindle motor 12, a turntable 13, and optical pickup and so on, and a clamp section 10b. As in the prior art device shown in FIG. 6, the reproduction section 10a is positioned under the clamp section 10b. The reproduction section 10a and the clamp section 10b respectively engage with an engagement member (not shown) which moves in a horizontal direction (a direction parallel to the plane of FIG. 7). The reproduction section 10a is configured that by the movement of the engagement member, it is moved in the direction perpendicular to the plane of FIG. 7 (the vertical direction in FIG. 6) so as to approach or part from a position facing the clamp section 10b.

The clamp section 10b includes such elements as a clamper 14 which is rotatable about an axis substantially coaxial with the rotating shaft of the turntable 13, and arranged to face with the turntable 13, and clamps the disk in cooperation with the turntable 13, a hook engagement part 15 which engages with a hook 4 of the tray 2 to draw the tray 2 out, a drawing lever 16 for actuating the hook engagement part 15 and a rotating cam 17 for driving the drawing lever 16 and a motor 18, and so on.

On both inner side wails of the housing 9, that is, the sides facing the driving device 10, there are provided guides (corresponding to the guide member 111 shown in FIG. 6) for positioning the driving device 10 as a whole at positions corresponding to each of the trays arranged in the housing 9, separately from these guides, a pair of rails 43, which are indicated by the cross-hatched parts in FIGS. 7 and 8, are formed in the chassis that constitutes a part of the clamp section 10b. Each of the rails 43 has a horizontal surface on witch the tray 2 is to be mounted when the tray 2 is drawn out from the magazine. The position of the horizontal surface is determined so that, when the driving device 10b is placed as a whole at a predetermined position, the horizontal surface exists at the same horizontal level as the supporting surface 3a on which the tray 2 carrying the selected disk is mounted. In other words, the rails 43 constitute the positioning section for positioning of the tray 2.

The reproduction section 10a and the clamp section 10b of the driving device 10 has the configuration as described above, and when the magazine is not retained in the retaining section 11, the driving device 10 is moved in the vertical direction and positioned at a predetermined stand-by position in the vertical direction by an elevation mechanism (not shown) fixed in the frame 9, In a state that the turntable 13 of the reproduction section 10a and the clamper 14 of the clamp section 10b are held to maintain a predetermined distance therebetween.

Figure 9A:
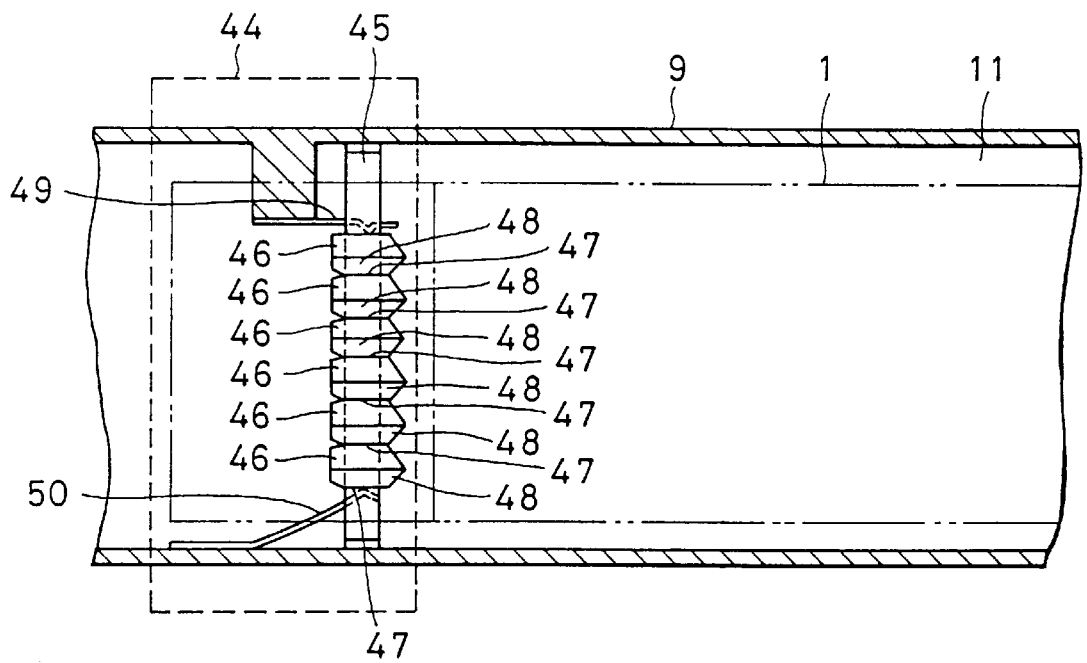
FIG. 9A is a view showing configuration of a guide member of one embodiment of the disk changer according to the present invention.
Figure 9B:
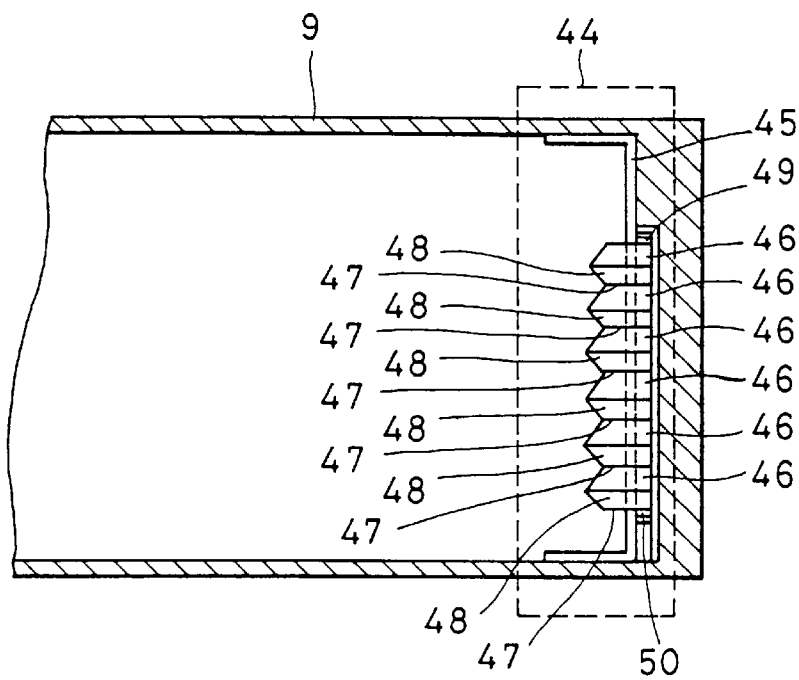
FIG. 9B is another view showing configuration of a guide member of the embodiment of the disk changer according to the present invention.

A guide member 44 which constitutes the guide means of the invention is provided on the inner walls of the housing 9 adjacent to the boundary to the driving device 10. FIG. 9A and FIG. 9B are views showing configuration of the guide member 44, in which FIG. 9A is a view showing the main unit shown in the FIG. 8, viewed from the front side (the side of the magazine inserting-opening). and 9B is a view showing the main unit shown in the FIG. 8, and viewed from the right side. The guide member 44 comprises a shaft 45 provided on an inner wall of the housing 9 adjoining the case 1 of the magazine retained in the retaining section 11, which shaft 45 has a straight portion in the vertical direction, and pieces 46 slidably fitted along the shaft 45. A top side and a bottom side of each piece 46 are formed as a pressing surface 47 which forms a substantially horizontal surface, and as illustrated in the figure, a slant surface 48 is respectively formed in succession to the pressing surface 47 of each piece 46. The number of pieces 46 is made equal to that of the trays 2 in the magazine, and in this example, the set of pieces is constituted by six pieces 46 corresponding to six trays.

The guide member 44 described above further includes elastic members 49 and 50 formed, for example, by a leaf spring or the like. Each of the elastic members 49 and 50 is arranged in a manner that it is fixed to the inner wall of the housing at its end, and the other ends compressively contact both ends of the plurality of pieces 46 which are arranged as explained above, so that each of the elastic members 49 and 50 respectively presses the plurality of pieces 46 from the upper or lower side with the predetermined elastic force. Also, the upper elastic member 49 is formed to have a larger elastic coefficient than the lower elastic member 50 so that the plurality of pieces 46 are held as a batch between the elastic members, and maintained elastically.

A position where each of these pieces 46 is held between the elastic members 49 and 50 and maintained by them is set so that the pressing surface 47 of each piece 46 is respectively placed at a position lower, in vertical direction by a predetermined distance, from the supporting surface 3a of the supporting section 3 on which the corresponding tray 2 is loaded.

The guide member 44 has the configuration as described above, and when each tray 2 is drawn out from the retaining position by the hook 15, the guide member 44 engages with a corresponding piece 46 and presses the drawn out tray 2 downwards by the specified elastic force.

In this way, the guide means is constituted by a guide member which comprises a plurality of elements described above, and a guide section corresponding to a tray is constituted by a pair of movable pieces 46 at the upper and lower positions respectively.

Next description is made below as to how a driving device selects and drives the disk. FIG. 8 is a view showing a state where the magazine in retained in the main unit shown in the FIG. 7. In FIG. 8, when a desired tray 2 is selected from the plurality of trays 2 in response to a instruction from the main unit, a loading motor (not shown herein) fixed in the housing 9 drives and causes the driving device 10 to move in the vertical direction to a position corresponding to the height of the selected tray 2 by means of the elevation mechanism which also is not shown in the figure.

After this movement, the horizontal surface of the pair of rails 43 provided in the clamp section 10b in the driving device 10 for loading thereon the trays 2 becomes substantially coincide with the height of the supporting traction 3 of the corresponding tray 2.

Also, the hook engagement part 15 provided in the clamp section 10b in the driving device 10 engages with a hook 4 of the selected tray 2.

When the motor 18 rotates and transfers its driving force to the rotating cam 17 via a plurality of gears provided in the clamp section 10b, the drawing-out lever 16 engaged with the rotating cam 17 turns about a shaft 16a. By this movement, the pin 15a engaged in the slot formed in the end of the drawing-out lever 16 moves to cause the hook engagement part 15 to pull the hook 48 of the tray 2 in the leftward direction in FIG. 8. By this force, the tray 2 is separated from the elastically maintaining section 5 and starts to move in the direction as indicated by an arrow E in FIG. 8, along a horizontal groove 10c formed in the clamp section 10b, and an operation for drawing out the tray 2 as well as a disk 6 loaded on the tray from the opening section 1a of the magazine is started.

Then, a tip section of the tray 2 started to move from the opening section 1a comes to contact with both slant surface sections 48 of the corresponding couple of pieces 46 of guide member 44. As shown in FIG. 10, the tip section further presses both of the slant surface sections 48 of the corresponding piece 46, whereby the corresponding pair of pieces 46 are pressed to spread upwards and downwards respectively along the shaft 45. As a result, the corresponding piece 46 adjoins the pressing surface 47 formed in succession to the slant surface section 48. The tray 2 moves into a space between the pressed-up piece 46 and the piece 46 which is right below the pressed-up piece, and is maintained between the upper and lower pieces as shown in FIG. 10.

At this point of time, the upper and lower pieces 46 respectively press the tray 2 with the elastic members 49 and 50, and as a result, the tray 2 is further pressed downward due to a difference between elastic forces of the elastic members 49 and 50 while being held between the upper and lower pieces.

Therefore, as described above, when a portion of the selected tray 2 is drawn out and engaged with the guide member 44, the tray 2 is maintained between the corresponding piece 46 and the other piece 46 right below the tray at the portion where the tray 2 is engaged with the guide member 44, and the force to press down the tray 2 is generated. As a result, the tray 2 on the supporting section 3 is pressed to the supporting section 3, and the tray 2 is maintained in the horizontal state.

Figure 11:
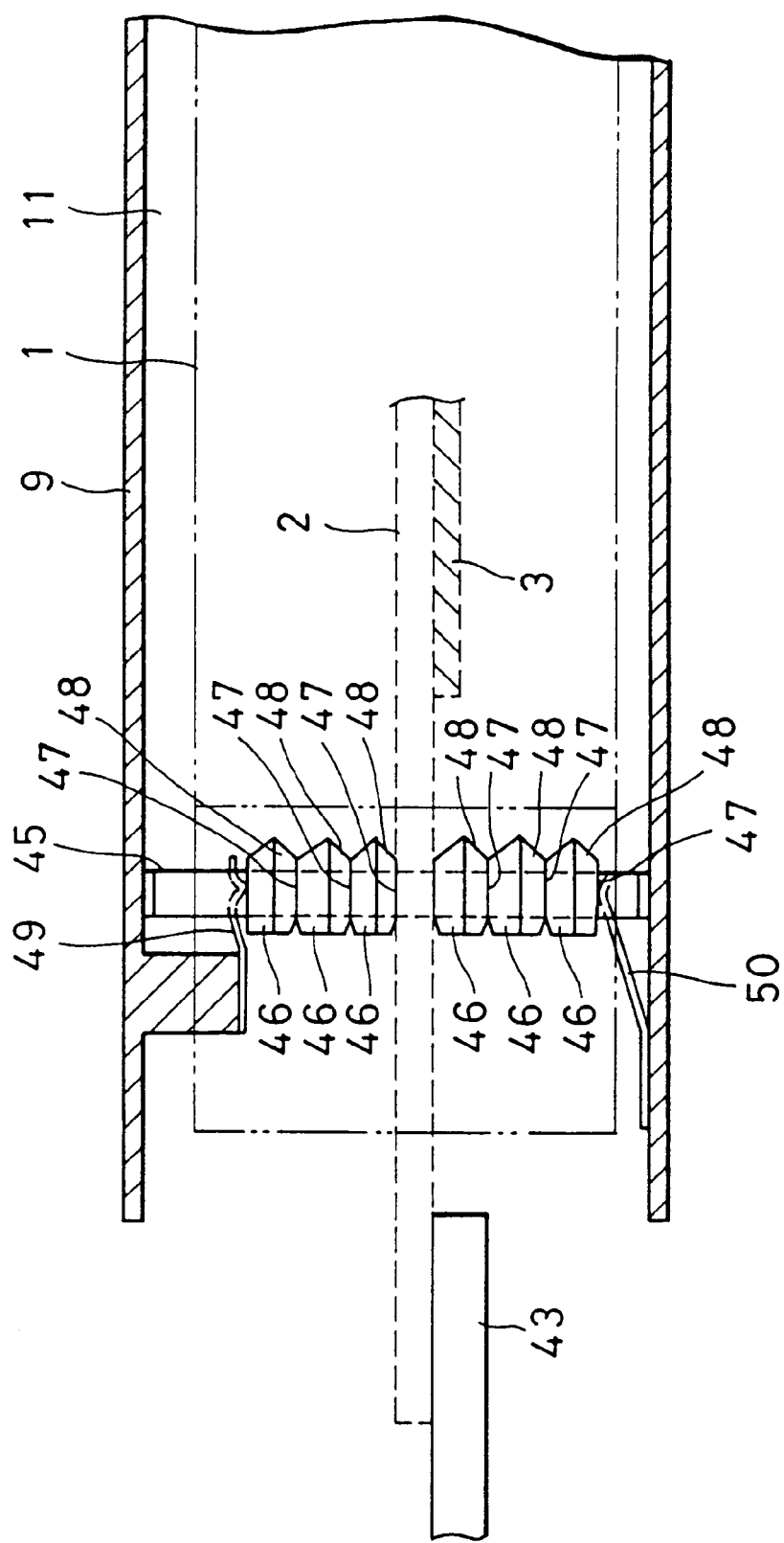
FIG. 11 is a view showing a state where a selected tray is drawn out and engaged with a guide member as well as a pair of rails by one embodiment of the disk changer according to the present invention.

Furthermore, when the hook engagement part 15 pulls the tray 2, the tray 2 slides on the pair of rails 43 having been provided at positions having the same height as that where the tray 2 is horizontally maintained, and moves to a disk clamp position between the reproduction section 10a and the clamp section 10b in the driving device. As shown in FIG. 11, also in this case a portion of the tray 2 is on the supporting section 3 and on the pair of rails 43, and other portion of the tray 2 engages with the guide member 44. Therefore, the tray 2 is maintained, at the portion where the tray 2 is engaged with the guide member 44, between the corresponding piece 46 and the other piece 46 right below the tray. At the same time, the tray 2 is pressed to the supporting section 3, and to the pair of rails 43, and accordingly the tray 2 is maintained stably and horizontally even if an impact or vibration or the like is applied to the tray from outside while the tray 2 is drawn out.

In this description, a "disk clamp position" represents a position of the tray drawing-out where a center of a disk 6 loaded on each tray 2 substantially corresponds to a rotating shaft of the spindle motor 12 when each tray 2 is drawn out into the driving device 10.

After the selected tray 2 has moved to the disk clamp position, by a further rotation of the rotating cam 17, an engaging members up-and-down moving lever (not shown) and so on is operated so that the reproduction section 10a is moved by a specified distance in the vertical direction, namely in the direction to approach the clamp section 10b.

By this feature, the disk 6 on the tray 2 locating at the disk clamp position is pressed upward from a lower Position by the turntable 13 of the reproduction section 10a, and separated from the tray 2, and then the disk engages with the clamper 14 of the clamp section 10b together with the turntable 13, whereby the disk is maintained at the playback position by the turntable 13 and the clamper 14 to insure the state where the disk can be played back.

While the disk 6 is being driven for playback, as mentioned above the drawn-out tray 2 is maintained between the corresponding piece 46 and the other piece 46 right below the tray, and at the same time the tray 2 is pressed to the pair of rails 43, so that the tray 2 is maintained stably in the horizontal direction even if an impact or vibration or the like is applied to the tray from outside while the disk is reproduced.

When playback is finished, by following the operational sequence described above in a reverse order, the selected disk and the tray corresponding to the disk are retained at the retaining positions in the case of the magazine. In this retaining procedure, the tray is stably maintained in the horizontal state even if an impact or vibration or the like is loaded to the tray from outside, as in the case of the drawing-out procedure.

In the embodiment of the present invention described above, a retaining section is provided inside a housing of the disk changer, and each of trays is respectively loaded in batch at the retaining position by inserting a magazine, in which a plurality of trays are retained, into the disk changer, but it should be noted the disk changer can be arranged that each tray is directly retained at respective retaining position in the disk changer without providing a independent magazine which can be attached to and Disconnected from the disk changer.

As the present invention has the configuration as described above, the selected tray is maintained by the guide member in the procedures that the selected tray is drawn out from the retaining position, the selected tray is put back to the retaining position, or in the procedure that the disk is driven, so that the disk changer can stably maintain the selected tray in the horizontal state even if an impact or vibration is applied from outside.

The most preferable embodiment of the present invention was explained above.

It should be noted that a person skilled in the art will possibly anticipate various variants and changes. Examples of such variants and changes are all considered to be included within a scope of attached claims.

What is claimed is:

1. A disk changer comprising:
   a disk retaining means for retaining a plurality of trays in respective retaining positions, on each of which trays a disk can be loaded, in a manner that said trays can be drawn out from their respective retaining positions;
   a guiding means which is disposed to correspond to said retaining positions, for guiding said trays in a process of drawing out said trays or a process of putting back said trays;
   a tray moving means for drawing out a tray selected from said plurality of trays retained in said retaining means and for putting back said selected tray to said retaining position; and
   a driving means for driving a disk moved by said selected tray drawn out by said tray moving means;
   wherein said guiding means elastically holds said selected tray when said selected tray is being drawn out by said tray moving means and after said selected tray has been drawn out, and is operative to prevent other ones of said trays from being drawn out when said selected tray is being drawn out.

2. A disk changer as claimed in claim 1, wherein said guiding means comprises a plurality of guide parts respectively corresponding to said trays being retained.

3. A disk changer as claimed in claim 2, wherein said guide parts are movable relative to predetermined positions corresponding to a position of each of said trays.

4. A disk changer as claimed in claim 2, wherein each of said guide parts comprises a movable piece arranged among a plurality of pieces, along a direction corresponding to a direction in which said trays are arranged.

5. A disk changer as claimed in claim 4, wherein said selected tray is supported by a pair of pieces selected from said plurality of pieces.

6. A disk changer as claimed in claim 5, wherein said plurality of pieces are slidably fitted on a shaft disposed in a direction which is substantially the same as the direction in which said trays are arranged.

7. A disk changer as claimed in claim 6, wherein each of said plurality of pieces has a slant portion which moves said pieces in said direction in which said pieces are arranged, when pressed by an end of a respective one of said trays.

8. A disk changer as claimed in claim 6, wherein said plurality of pieces are pushed by a resilient force in the dlrection, in which said plurality of pieces are arranged.

9. A disk changer as claimed in claim 8, wherein each of said plurality of pieces has a slant portion which moves said pieces in said direction in which said pieces are arranged, when pressed by an end of a respective one of said trays.

10. A disk changer as claimed in claim 8, wherein said plurality of pieces are pushed by resilient forces at both ends thereof in said direction in which said pieces are arranged.

11. A disk changer as claimed in claim 10, wherein each of said plurality of pieces has a slant portion which moves said pieces in said direction in which said pieces are arranged, when pressed by an end of a respective one of said trays.

12. A disk changer as claimed in claim 10, wherein said resilient forces, which are applied to both ends of said plurality of pieces in said direction in which said pieces are arranged differ from each other in magnitude.

13. A disk changer as claimed in claim 12, wherein each of said plurality of pieces has a slant portion which moves said pieces in said direction in which said pieces are arranged, when pressed by an end of a respective one of said trays.

14. A disk changer as claimed in claim 4, wherein said plurality of pieces are pushed by a resilient force in the direction in which said plurality of pieces are arranged.

15. A disk changer as claimed in claim 14, wherein each of said plurality of pieces has a slant portion which moves said pieces in the direction in which said pieces are arranged, when pressed by an end of a respective one of said trays.

16. A disk changer as claimed in claim 14, wherein said plurality of pieces are pushed by resilient forces at both ends thereof in the direction in which said pieces are arranged.

17. A disk changer as claimed in claim 16, wherein each of said plurality of pieces has a slant portion which moves said pieces in the direction in which said pieces are arranged, when pressed by an end of a respective one of said trays.

18. A disk changer as claimed in claim 16, wherein said resilient forces, which are applied to both ends of said plurality of pieces in the direction in which said pieces are arranged, differ from each other in magnitude.

19. A disk changer as claimed in claim 18, wherein each of said plurality of pieces has a slant portion which moves said pieces in the direction in which said pieces are arranged when pressed by an end of respective one of said trays.

20. A disk changer comprising:

a disk retaining means for retaining a plurality of trays, on each of which a disk can be loaded, in a manner that said trays can be drawn out from their retaining positions respectively;

a guiding means which is disposed to correspond to said retaining positions, for guiding said trays in a process of drawing out said trays or a process of putting back said trays;

a tray moving means for drawing out a tray selected from said plurality of trays retained in said retaining means and for putting back said selected tray to said retaining position; and a driving means for driving a disk moved by said selected tray drawn out by said tray moving means, wherein said disk retaining means has a supporting part which supports said trays at predetermined positions distributed along a direction in which said trays are arranged, and wherein said guiding means elastically support said selected tray in a manner as to push said selected tray against said supporting part while said selected tray is being drawn out by said tray moving means and when said selected tray has been drawn out, and is operative to prevent other ones of said trays from being drawn out when said selected tray is being drawn out.

21. A disk changer comprising:

a disk retaining means for retaining a plurality of trays, on each of which a disk can be loaded, in a manner that said trays can be drawn out from their retaining positions respectively;

a guiding means which is disposed to correspond to said retaining positions, for guiding said trays in a process of drawing out said trays and a process of putting back said trays;

a tray moving means for drawing out a tray selected from said plurality of trays retained in said retaining means and for putting back said selected tray to said retaining position; and a driving means for driving a disk moved by said selected tray drawn out by said tray moving means, wherein said driving means has a positioning part which supports said selected tray drawn out, and wherein said guiding means elastically support said selected tray in a manner as to push said selected tray against said positioning part while said selected tray is being drawn out by said tray moving means and when said selected tray has been drawn out, and is operative to prevent other ones of said trays from being drawn out when said selected tray is being drawn out.

22. A disk changer comprising:

a retainer section for retaining a plurality of disk holder trays in respective retaining positions, in a manner that said trays can be drawn out of their respective retaining positions;

a tray moving device adapted to draw out a selected tray from its retaining position in said retainer section and to replace said selected tray in said retainer section;

a driving unit adapted to receive said selected tray which has been withdrawn from the retainer section, and to drive a disk contained in said selected tray, for reproducing information contained in said disk; and a guide unit disposed to correspond to said retaining positions of said retainer section, said guide unit comprising guide parts which elastically hold said selected tray when said selected tray is being drawn out of said retainer section and after said selected tray has been drawn out, and is operative to prevent other ones of said trays from being drawn out when said selected tray is being drawn out.

* * * * *